CARCASS CHILLING PROCESS

Ralph R. Hansen, Barrington, Thomas A. Ray, La Grange, and Gerhard M. Reimer, Chicago, Ill., assignors to Swift & Company, Chicago, Ill.
No Drawing. Filed Mar. 31, 1971, Ser. No. 129,974
Int. Cl. A22c *18/00;* A23b *1/06*
U.S. Cl. 99—194
9 Claims

ABSTRACT OF THE DISCLOSURE

A method of chilling carcass meat to substantially reduce the shrinkage loss attributable to the moisture evaporation from freshly killed animals so as to maintain the freshness and bloom of the meat and to substantially reduce the bacterial count is disclosed.

---

This invention is primarily concerned with a method of conducting the chilling operation in a packinghouse to substantially reduce the shrinkage loss attributable to moisture evaporation from freshly dressed carcasses of cattle, sheep, swine, goat, horse, mule, game animals, wild fowl and poultry or other equine and meat animals; and to substantially reduce the bacteria count while establishing the level of refrigeration restraints and bacteria control that are required for suitable holding, marketing, or further processing of meat products.

For many years the meat packing industry has been aware of the shrink that occurs in meat carcasses after they are dressed and has stressed refrigeration as an essential procedure "to retard bacterial action" (Meat Packing Plant Refrigeration Part I—Prepared under Direction of Joint ASRE-AMI Meat Packing Committee). Immediately upon slaughtering and dressing, the carcasses are conveyed to a refrigerated room to reduce the temperature of the carcass from approximately body heat down to a refrigeration temperature of about 36–40° F. This usually takes about 24 hours; and during this period of time, the weight of the carcass will decrease due to loss of moisture equal to approximately 1–3% by weight.

In order to reduce this loss in weight, commonly termed shrink, efforts are made to humidify the refrigerated chambers. A number of procedures have been used to add moisture to the refrigerated air. For example, the addition of steam to the cooler, to lessen shrinkage. However, it is questionable whether there has been any economic gain because of the added refrigeration expense.

In addition, since it is desirable to chill as quickly as possible to minimize shrink and bacteria growth, it is customary to reduce the temperature of the air in the refrigerated chamber to about 26–35° F. or even less. However, the relative humidity of air at 26–35° F. is considerably different from the relative humidity at 104° F. (original body temperature of the red meat carcass) so that there is an enormous evaporative capacity in the air contacting the surface of the carcass. This capacity is accelerated with high air velocity provided in the chilling process. This causes subtraction of the natural moisture from the carcass and absorption into the surrounding air, thereby reducing the overall weight of the carcass.

In addition, cold air refrigeration has been the primary procedure for retention of freshness and suppression of bacterial growth in meat products. Even under the most sanitary slaughtering conditions, bacteria are present on the surface of meat carcasses. It is quite apparent that any chilling system that provides bacteria control apart from temperature control will result in a less costly system to the meat packer. Such a system will remove some of the existing refrigeration restraints, and be a welcome advance in the packinghouse art.

It is, therefore, one object of this invention to provide a system wherein a lesser refrigeration capacity will satisfactorily achieve a suitable and fresh product for the market.

It is also an object of this invention to provide a chilling operation for freshly dressed carcasses wherein the shrink loss is held to a minimum.

It is still a further object of this invention to provide a chilling system that does not discolor the carcass, remove the bloom or otherwise affect the salability of the product.

An additional object of this invention is to provide a process for holding carcasses above about 50° F. without spoilage while accelerating the action of the natural enzymes in the meat to cause tenderization.

Other advantages not specifically set forth herein will be readily apparent to those skilled in the art upon a reading of the detailed description of the invention which follows.

In general, this invention is directed to a method of conducting a chilling operation on dressed carcasses so as to permit a substantial reduction in shrink and a reduction in refrigeration requirements yet produce an appealing product that is adequately protected against spoilage either in storage or in transit. While the process of this invention is applicable to the treatment of carcasses of all edible meats, the invention will be illustrated by reference to hogs. In the process, freshly dressed carcasses are conveyed from the killing floor to a chilling zone wherein they are sprayed intermittently with a chlorine containing spray solution. It has been determined that the greatest amount of shrinkage occurs while the carcass temperature drops from about 104° F. to about 80° F.–85° F. Also a temperature range of about 104° F. to about 50° F. provides the greatest potential for bacteria growth. Hence, it is important that the spray operation commence before the freshly dressed carcass reaches a temperature of about 80° F. and it is usually started as soon as the carcass reaches the chill chamber. The intermittent spray system need not be conducted for more than about 8 to 10 hours and the hog carcasses are merely allowed to chill and temper an additional 12 to 18 hours so as to reach a dry surface condition and a temperature of about 38° F. in roughly 24 hours.

Any time after chilling, the carcasses can be conveyed in dry surface condition to the cutting room. Generally, the cutting of carcasses is usually conducted on meat having a temperature of about 34–45° F. However, the instant process allows one to raise the temperature of the meat to a 50–75° F. level so as to age the meat for 1 to 4 days without significant bacterial growth taking place. After the tenderization process, the meat may be then tempered to the proper temperature for cutting. Conversely, the carcasses may be cut in various sections immediately exiting the cooling chamber and the sections of meat allowed to raise to the 50–75° F. level and aged for the required 1 to 4 days without bacterial spoilage.

More in detail, chlorine gas is introduced into spray water having a temperature of about 45–65° F. in an amount of more than about 10 p.p.m. and usually above 25 p.p.m. but not substantially in excess of about 200 p.p.m. Spray water in a total amount of about 1½ to 3 quarts is directed onto the carcass from an overhead position so as to wet all surfaces of the carcass.

In the process, freshly dressed carcasses are conveyed from the killing floor to a chilling chamber wherein they are sprayed for about 40 to 110 seconds, usually about 60–90 seconds with a chlorine containing spray (approximately 2 quarts of water containing about 50–150 p.p.m. of chlorine) every 20 to 40 minutes (usually every 30 minutes) for about 6 to about 10 hours (usually about 8 hours).

Under the procedure of this invention, the aqueous chlorine solution containing not substantially in excess of 200 p.p.m. chlorine is placed on the carcasses intermittently during the chilling and holding cycle in such an amount and at intervals which permit the destruction of bacteria and the placement of an intervening layer of moisture for evaporation in lieu of the evaporation of the natural meat moisture during chilling or storage. The retention of the natural meat moisture contributes to the freshness, tenderness and juiciness of a particular meat item and results in a more desirable cooked product. The evaporation of the solution provides a chilling effect on the surface.

Variations in the interval between application of the chlorine-containing aqueous solution, variations in the amount of the solution applied and variations in the level of the chlorine in solution all can be made with beneficial results with respect to bacteria and shrink control. The specific application selected will vary with the type, condition, piece weight of the meat to be processed, and the optimum end result for achieving the desired product. It should be noted, however, that the minimum amount of water, when applied in an intermittent fashion will provide an adequate humidity condition that will reduce the drying effect of the air movement over the carcasses and substantially reduce the excessive shrinkage otherwise experienced in the chilling of hogs, cattle, sheep, antelope, deer, turkey, chicken and other species of edible meat.

The procedure of this invention removes some of the existing refrigeration restraints for suitable holding and marketing of meat products. For instance, pork cuts which are normally chilled to a 26–28° F. temperature to protect against spoilage in transit or in storage no longer need this critical control for it has been determined that equal protection under the procedure of this invention can be achieved at 34–36° F. A further beneficial result is obtainable in applying the process to the tendering of meat. The reduction and control of bacterial growth with chlorinated spray permits the meat to be held for a significant period of time for aging at a raised temperature (45–75° F.) without spoilage. This temperature and time effect permits the action of natural (intrinsic) enzymes to tenderize the meat. Intermittent chlorinated spray can be applied to the meat during the holding period as required to suppress bacterial growth and minimize shrink loss until the desired marketing state is achieved for the meat product.

The spray chilling procedure permits the introduction of chlorine with a significant reduction in surface bacteria on meat carcasses during the chilling cycle. The reduction of bacteria at this point is even more significant when it is realized that at this temperature range the meat is at an incubation temperature for bacterial growth.

In order to confirm the merits of this invention, random sampling procedures were followed to determine bacteria and shrink effects of the system. Bacteria testing was performed using Agar plates. In summary, 100% of the carcasses tested showed bacteria counts as they entered the cooler. Of the control carcasses (no spray) 100% showed bacteria at the end of the chill cycle (22 to 24 hours). Test carcasses with chlorinated spray, recorded 80% of the carcasses with no bacterial count at the end of the chill cycle and 20% showing bacteria of a sharply reduced count. Shrinks were checked on random hogs with and without spray using a strain gauge. The average shrink improvement with spray over a period of ten days on 659 hogs was .48%. Subsequent evaluation of the antimicrobial efficacy of the chlorinated spray chill system showed that mold contamination on the carcasses entering the cooler was eliminated by the process.

It is apparent that many modifications and variations of the invention as hereinbefore set forth may be made without departing from the spirit and scope thereof. The specific embodiments described in the specification are given by way of illustration only and the invention is to be limited only by the terms of the appended claims.

We claim:

1. A method of chilling carcass meat to substantially reduce the shrinkage loss attributable to the moisture evaporation from freshly killed animals so as to maintain the freshness and bloom of the meat and to substantially reduce the bacterial count thereof, which comprises forming a chlorine spray solution containing chlorine in an amount to substantially reduce the bacterial count but not sufficient to affect the salability of the product, first spraying the solution upon a carcass in a chilling chamber prior to the temperature of the carcass reaching about 80° F. and thereafter intermittently spraying the solution upon the carcass for a period of time less than normally required during the chilling period, and removing said carcass from the chilling chamber.

2. The method of claim 1 wherein the chlorine spray is intermittently sprayed upon the carcass for about 40 to about 110 seconds during 20 to 40 minute intervals.

3. The process of claim 1 wherein the carcass is sprayed for about 1 to 1½ minutes with a chlorine spray containing about 50 to about 200 p.p.m. of chlorine about every 20 to 40 minutes for a total time of about 6 to about 10 hours.

4. The method of claim 1 wherein the intermittent spray contacts the carcass in the chilling room prior to the temperature of the carcass reaching 85° F.

5. The method of claim 1 wherein the carcass is a hog carcass and the chlorine spray is intermittently sprayed upon the carcass approximately every 30 minutes for about 1 to 1½ minutes for approximately a total time of 6 to 10 hours.

6. The method of claim 1 wherein the spray is an aqueous solution containing about 50–200 p.p.m. of chlorine.

7. The method of holding a carcass previously chilled as in claim 1 in an aging environment for tenderizing the meat.

8. The method of claim 1 in which the carcass is held at a temperature between about 45° F. and about 75° F.

9. The method of claim 7 in which the carcass is subjected to a spray of an aqueous solution containing about 50–200 p.p.m. of chlorine at intervals of about 20 to 40 minutes for a spray period of between about 40 and about 110 seconds during the aging period.

References Cited

UNITED STATES PATENTS

| | | | |
|---|---|---|---|
| 2,009,033 | 7/1935 | Swenson | 99—194 |
| 2,169,081 | 8/1939 | James | 99—107 |
| 2,860,056 | 11/1958 | Bradford | 99—194 |
| 3,026,206 | 3/1962 | Williams | 99—107 |

HYMAN LORD, Primary Examiner

U.S. Cl. X.R.

99—107, 157

PO-1050
(5/69)

UNITED STATES PATENT OFFICE
CERTIFICATE OF CORRECTION

Patent No. 3,745,026                     Dated  July 10, 1973

Inventor(s) Ralph R. Hansen, Thomas A. Ray and Gerhard M. Reimer

It is certified that error appears in the above-identified patent and that said Letters Patent are hereby corrected as shown below:

Column 4, line 48 - cancel "claim 1" and substitute therefor --claim 7--.

Signed and sealed this 27th day of November 1973.

(SEAL)
Attest:

EDWARD M. FLETCHER, JR.
Attesting Officer

RENE D. TEGTMEYER
Acting Commissioner of Patents